United States Patent
Yi et al.

(10) Patent No.: US 10,986,663 B2
(45) Date of Patent: Apr. 20, 2021

(54) UPLINK SIGNAL TRANSMISSION BASED ON TIMING ADVANCE VALUE

(71) Applicant: LG Electronics Inc., Seoul (KR)

(72) Inventors: Seungjune Yi, Seoul (KR); Sunyoung Lee, Seoul (KR); Jongwoo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/321,897

(22) PCT Filed: Aug. 8, 2017

(86) PCT No.: PCT/KR2017/008539
§ 371 (c)(1),
(2) Date: Jan. 30, 2019

(87) PCT Pub. No.: WO2018/030745
PCT Pub. Date: Feb. 15, 2018

(65) Prior Publication Data
US 2019/0182862 A1 Jun. 13, 2019

Related U.S. Application Data

(60) Provisional application No. 62/374,013, filed on Aug. 12, 2016.

(51) Int. Cl.
*H04W 4/00* (2018.01)
*H04W 74/02* (2009.01)
(Continued)

(52) U.S. Cl.
CPC ....... *H04W 74/02* (2013.01); *H04W 56/0045* (2013.01); *H04W 74/008* (2013.01);
(Continued)

(58) Field of Classification Search
CPC ............... H04W 72/042; H04W 76/27; H04W 56/0045; H04W 74/008; H04W 74/085; H04W 74/0816; H04W 88/06; H04W 76/15; H04W 72/0446; H04L 5/0053; H04L 5/0048; H04L 5/0007; H04L 1/1812
See application file for complete search history.

(56) References Cited

U.S. PATENT DOCUMENTS

2012/0257601 A1 10/2012 Kim et al.
2013/0114574 A1* 5/2013 Ng .......................... H04L 5/001
370/336
(Continued)

FOREIGN PATENT DOCUMENTS

WO 2015/175291 A1 11/2015

*Primary Examiner* — Atique Ahmed
(74) *Attorney, Agent, or Firm* — Dentons US LLP (57) ABSTRACT

The present invention relates to uplink signal transmission by a user equipment (UE) in terms of timing advance value in a wireless communication system. According to an embodiment of the invention, the UE applies a predetermined timing advance value for a TAG (Timing Advance Group) if the TAG includes only one or more first type cells. Here, a random access procedure is not supported on the first type cells. Based on it, the UE transmits the uplink signals to the network on one of the first type cells based on the timing advance value applied for the TAG.

6 Claims, 6 Drawing Sheets

(51) Int. Cl.
*H04W 56/00* (2009.01)
*H04W 74/00* (2009.01)
*H04W 74/08* (2009.01)
*H04W 88/06* (2009.01)
*H04W 76/15* (2018.01)

(52) U.S. Cl.
CPC ..... *H04W 74/085* (2013.01); *H04W 74/0816* (2013.01); *H04W 88/06* (2013.01); *H04W 74/0833* (2013.01); *H04W 76/15* (2018.02)

(56) References Cited

U.S. PATENT DOCUMENTS

| | | | |
|---|---|---|---|
| 2013/0142113 A1* | 6/2013 | Fong | H04W 68/02 370/328 |
| 2013/0250925 A1* | 9/2013 | Lohr | H04W 72/0446 370/336 |
| 2014/0050194 A1 | 2/2014 | Gaal et al. | |
| 2016/0021648 A1 | 1/2016 | Blankenship et al. | |
| 2017/0006599 A1* | 1/2017 | Dinan | H04L 27/26 |
| 2017/0006640 A1* | 1/2017 | Dinan | H04W 74/0833 |
| 2017/0006641 A1* | 1/2017 | Dinan | H04W 76/27 |

* cited by examiner

UPLINK SIGNAL TRANSMISSION BASED ON TIMING ADVANCE VALUE

This application is a 35 use § 371 national stage entry of international application no. PCT/KR2017/008539 filed on Aug. 8, 2017, and claims priority to U.S. provisional application No. 62/374,013 filed on Aug. 12, 2016, all of which are hereby incorporated by reference in their entireties as if fully set forth herein.

TECHNICAL FIELD

The present invention relates to uplink signal transmission scheme by an user equipment (UE) based on timing advance value. Specifically, the present invention is directed to the uplink signal transmission scheme in a wireless communication system supporting LAA (Licensed Assisted Access).

BACKGROUND ART

As an example of a mobile communication system to which the present invention is applicable, a 3rd Generation Partnership Project Long Term Evolution (hereinafter, referred to as LTE) communication system is described in brief.

Figure 1:
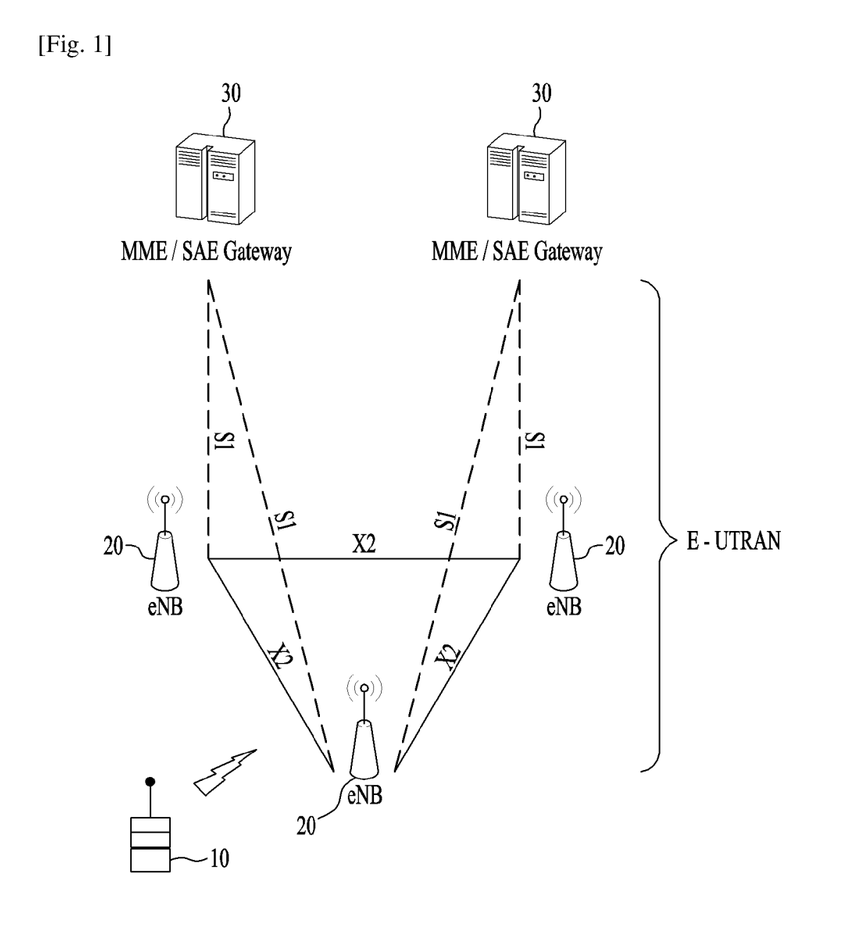
FIG. 1 is a block diagram illustrating network structure of an evolved universal mobile telecommunication system (E-UMTS)

FIG. 1 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 1, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

For uplink signal transmission, the UE has to consider the timing advance value.

Figure 2:
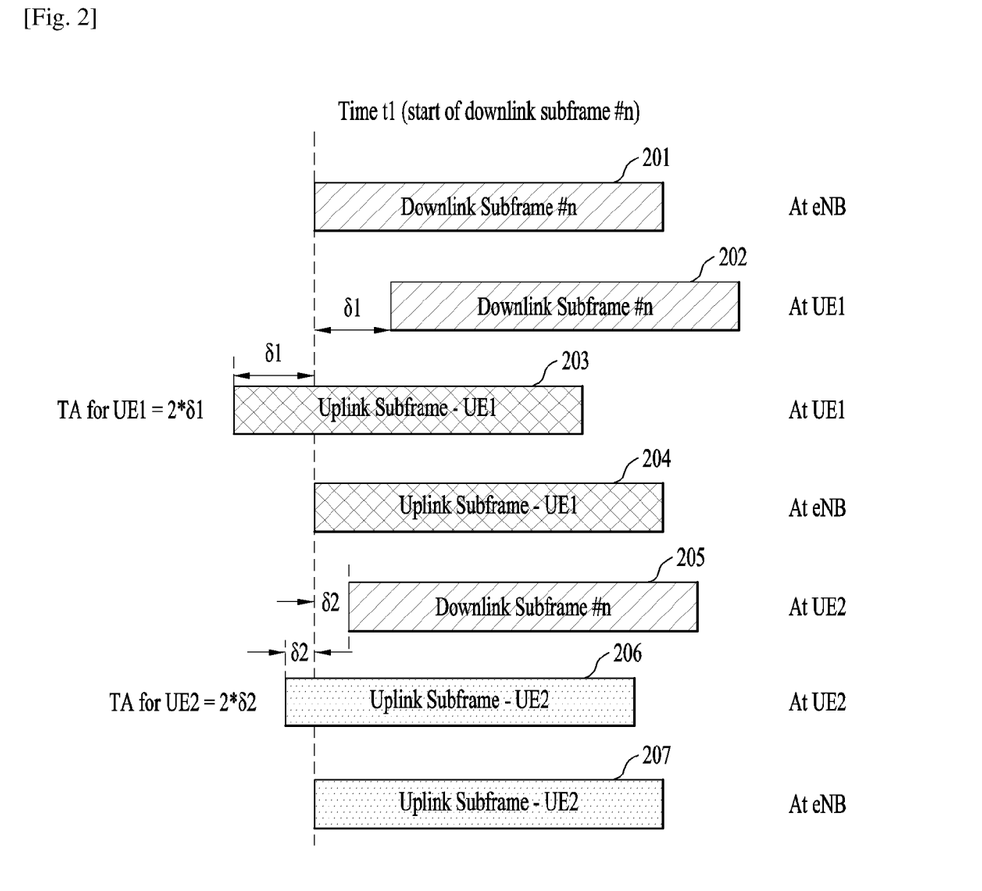
FIG. 2 is a conceptual diagram for explaining timing advance value in mobile telecommunication system.

FIG. 2 is a conceptual diagram for explaining timing advance value in mobile telecommunication system.

When a start of downlink subframe #n is denoted as 't1' at eNB side, this downlink subframe #n may be received after 'σ1' period from at UE 1, as denoted as reference number 202. So, in order to fit to the timing of the eNB, the UE1 is required to transmit uplink signal 'σ1' period earlier than 't1', as denoted as reference number 203. Thereby, the uplink subframe transmitted by the UE may be received at 't1' at the eNB as denoted as reference number 204. In this case, the 3GPP system defines the timing advance value for UE1 as 2*σ1 as shown in FIG. 2.

The timing advance value may be different for each UE. For example, if UE 2 is closer to the eNB than UE1, the timing advance value for UE2, '2*σ2', may be smaller than that for UE1, as shown in FIG. 2.

Conventionally, in order to acquire the timing advance (TA) value for each UE, the UE has to perform a random access procedure. However, for some cells, such as LAA (Licensed Assisted Access) SCell (Secondary Cell), performing the random access procedure may not be preferred. So, detailed study on other options for acquiring TA value other than the random access procedure is required, in terms of the situation of the UE.

DISCLOSURE OF INVENTION

Technical Problem

An object of the present invention devised to solve the problem lies in the conventional mobile communication system. The technical problems solved by the present invention are not limited to the above technical problems and those skilled in the art may understand other technical problems from the following description.

Solution to Problem

To achieve the object of the present invention, in one aspect, a method for a user equipment (UE) transmitting uplink signals to a network, the method comprising: applying a predetermined timing advance value for a TAG (Timing Advance Group) if the TAG includes only one or more first type cells, wherein a random access procedure is not supported on the first type cells; and transmitting the uplink signals to the network on one of the first type cells based on the timing advance value applied for the TAG, is provided.

The first type cells may be LAA (Licensed Assisted Access) secondary Cells, but they can be other cells where the random access is not supported or preferred.

The predetermined timing advance value may be 0.

If the TAG includes one or more second type cells where the random access procedure is supported, the method may further comprises: performing the random access procedure on one of the second type cells to receive a timing advance value from the network; and applying the received timing advance value for the TAG.

Here, the second type cells may include one or more of a primary cell and secondary cells configured in a licensed spectrum.

In another aspect of the present invention, a user equipment (UE) for transmitting uplink signals to a network, the UE comprising: a processor configured to apply a predetermined timing advance value for a TAG (Timing Advance Group) if the TAG includes only one or more first type cells, wherein a random access procedure is not supported on the first type cells; and a transceiver connected to the processor and configured to transmit the uplink signals to the network on one of the first type cells based on the timing advance value applied for the TAG, is provided.

The first type cells may be LAA (Licensed Assisted Access) secondary Cells.

The predetermined timing advance value may be set to 0.

If the TAG includes one or more second type cells where the random access procedure is supported, the processor may be further configured to perform the random access procedure on one of second type cells to receive a timing advance value from the network.

The second type cells may include one or more of a primary cell and secondary cells configured in a licensed spectrum.

It is to be understood that both the foregoing general description and the following detailed description of the present invention are exemplary and explanatory and are intended to provide further explanation of the invention as claimed.

Advantageous Effects of Invention

According to the present invention, the UE can acquire the TA value even without performing the random access procedure by considering the type of cells within the TAG.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

MODE FOR THE INVENTION

The configuration, operation and other features of the present invention will be understood by the embodiments of the present invention described with reference to the accompanying drawings. The following embodiments are examples of applying the technical features of the present invention to a 3rd generation partnership project (3GPP) system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition.

Figure 3:
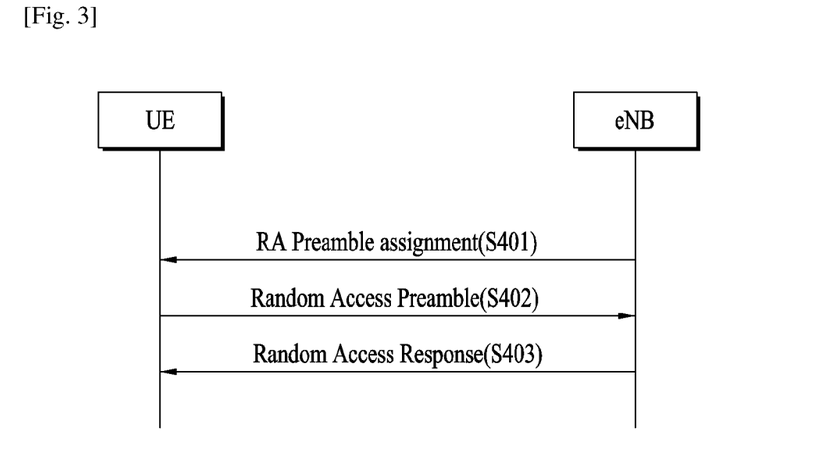
FIG. 3 is a diagram illustrating an operation procedure of a user equipment and a base station during a non-contention based random access procedure.

FIG. 3 is a diagram illustrating an operation procedure of a user equipment and a base station during a non-contention based random access procedure.

(1) Random Access Preamble Assignment

The non-contention based random access procedure can be performed for two cases, i.e., (1) when a handover procedure is performed, and (2) when requested by a command of the base station. Of course, the contention based random access procedure may also be performed for the two cases.

First of all, for non-contention based random access procedure, it is important that the user equipment receives a designated random access preamble having no possibility of contention from the base station. Examples of a method of receiving a random access preamble include a method through a handover command and a method through a PDCCH command. A random access preamble is assigned to the user equipment through the method of receiving a random access preamble (S401).

(2) First Message Transmission

As described above, after receiving a random access preamble designated only for the user equipment, the user equipment transmits the preamble to the base station (S402).

(3) Second Message Reception

After the user equipment transmits the random access preamble in step S402, the base station tries to receive its random access response within a random access response receiving window indicated through system information or handover command (S403). In more detail, the random access response can be transmitted in the form of a MAC protocol data unit (MAC PDU), and the MAC PDU can be transferred through a physical downlink shared channel (PDSCH). Also, it is preferable that the user equipment monitors a physical downlink control channel (PDCCH) to appropriately receive information transferred to the PDSCH. Namely, it is preferable that the PDCCH includes information of a user equipment which should receive the PDSCH, frequency and time information of radio resources of the PDSCH, and a transport format of the PDSCH. If the user equipment successfully receives the PDCCH transmitted thereto, the user equipment can appropriately receive a random access response transmitted to the PDSCH in accordance with the information of the PDCCH. The random access response can include a random access preamble identifier (ID) (for example, random access preamble identifier (RA-RNTI)), uplink grant indicating uplink radio resources, a temporary C-RNTI, and timing advance command (TAC) values.

As described above, the random access preamble identifier is required for the random access response to indicate whether the uplink grant, the temporary C-RNTI and the TAC values are effective for what user equipment as random access response information for one or more user equipments can be included in one random access response. In this case, it is assumed that the user equipment selects a random access preamble identifier corresponding to the random access preamble selected in step S402.

In the non-contention based random access procedure, the user equipment can terminate the random access procedure after determining that the random access procedure has been normally performed by receiving the random access response information.

Figure 4:
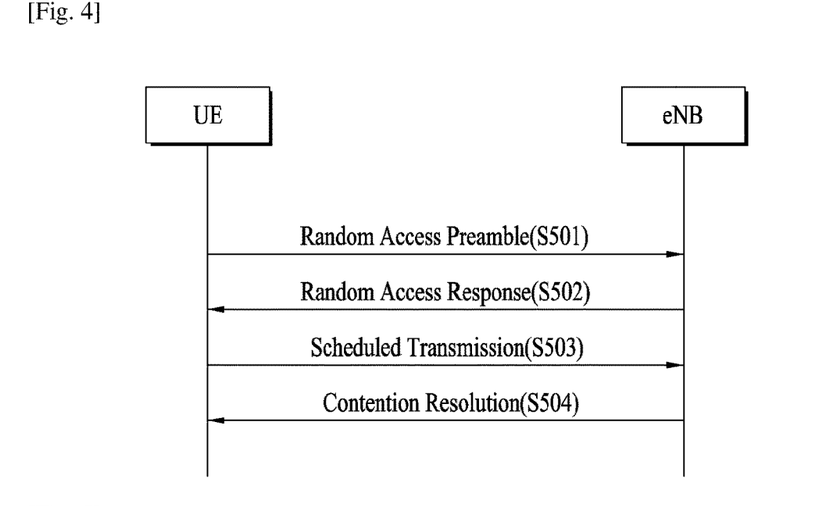
FIG. 4 is a diagram illustrating an operation procedure of a user equipment and a base station during a contention based random access procedure.

FIG. 4 is a diagram illustrating an operation procedure of a user equipment and a base station during a contention based random access procedure.

(1) First Message Transmission

First of all, the user equipment randomly selects one random, access preamble from a set of random access preambles indicated through system information or handover command, and selects a physical RACH (PRACH) resource that can transmit the random access preamble (S501).

(2) Second Message Reception

A method of receiving random access response information is similar to that of the aforementioned non-contention based random access procedure. Namely, after the user equipment transmits the random access preamble in step S402, the base station tries to receive its random access response within a random access response receiving window indicated through system information or handover command, and receives the PDCCH through corresponding random access identifier information (S502). In this case, the base station can receive uplink grant, a temporary C-RNTI, and timing advance command (TAC) values.

(3) Third Message Transmission

If the user equipment receives its effective random access response, the user equipment respective processes information included in the random access response. Namely, the user equipment applies TAC and store a temporary C-RNTI. Also, the user equipment transmits data (i.e., third message) to the base station using UL grant (S503). The third message should include a user equipment identifier. This is because that the base station needs to identify user equipments which perform the contention based random access procedure, thereby avoiding contention later.

Two methods have been discussed to include the user equipment identifier in the third message. In the first method, if the user equipment has an effective cell identifier previously assigned from a corresponding cell before the random access procedure, the user equipment transmits its cell identifier through an uplink transport signal corresponding to the UL grant. On the other hand, if the user equipment does not have an effective cell identifier previously assigned from a corresponding cell before the random access procedure, the user equipment transmits its cell identifier including its unique identifier (for example, S-TMSI or random ID). Generally, the unique identifier is longer than the cell identifier. If the user equipment transmits data corresponding to the UL grant, the user equipment starts a contention resolution tinier.

(4) Fourth Message Reception

After transmitting data including its identifier through UL grant included in the random access response, the user equipment waits for a command of the base station for contention resolution. Namely, the user equipment tries to receive the PDCCH to receive a specific message (504). Two methods have been discussed to receive the PDCCH. As described above, if the third message is transmitted to correspond to the UL grant using the user equipment identifier, the user equipment tries to receive the PDCCH using its cell identifier. If the user equipment identifier is a unique identifier of the user equipment, the user equipment tries to receive the PDCCH using a temporary cell identifier included in the random access response. Afterwards, in case of the first method, if the user equipment receives the PDCCH through its cell identifier before the contention resolution timer expires, the user equipment determines that the random access procedure has been performed normally, and ends the random access procedure. In case of the second method, if the user equipment receives the PDCCH through the temporary cell identifier before the contention resolution timer expires, the user equipment identifies data transferred from the PDSCH. If the unique identifier of the user equipment is included in the data, the user equipment determines that the random access procedure has been performed normally, and ends the random access procedure.

Based on these contention-free random access (CFRA) and/or contention-based random access (CBRA), the UE can acquire TA value. However, for some cases, such as on LAA (Licensed Assisted Access) SCell (Secondary Cell), performing the random access procedure may not be preferred. Hereinafter, new technology using unlicensed spectrum, such as LAA, is explained.

Figure 5:
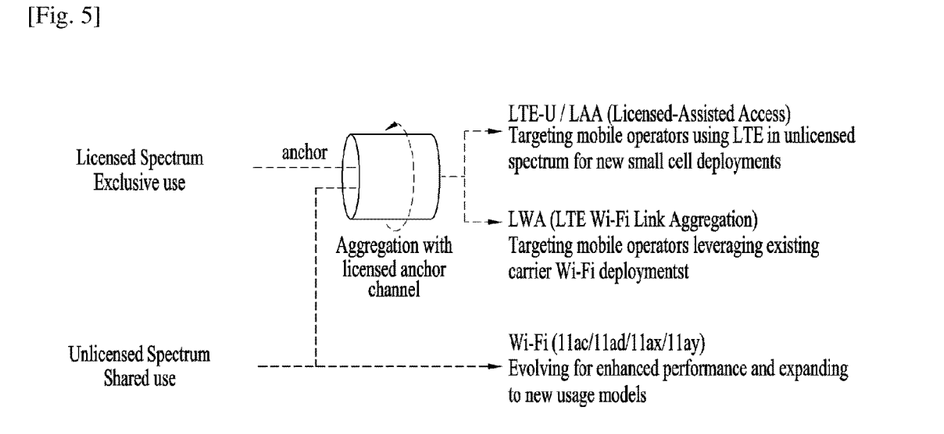
FIG. 5 is a conceptual diagram explaining new technology using unlicensed spectrum.

FIG. 5 is a conceptual diagram explaining new technology using unlicensed spectrum.

As shown in FIG. 5, the unlicensed spectrum for these schemes are supposed as spectrum used for Wi-Fi system, such as IEEE 802.11ac/ad/ax/ay. LTE-U/LAA is directed to aggregate the licensed spectrum, as anchor carrier, with unlicensed spectrum. It is targeting mobile operators using LTE in unlicensed spectrum for new small cell deployment. LWA (LTE Wi-Fi link Aggregation) is also directed to aggregate the LTE link with Wi-Fi link. It is targeting mobile operators leverage existing carrier Wi-Fi deployments.

Specifically, for LAA scheme, the unlicensed spectrum is aggregated with licensed spectrum based on carrier aggregation (CA) scheme. To better understand this, the CA scheme is explained.

Figure 6:
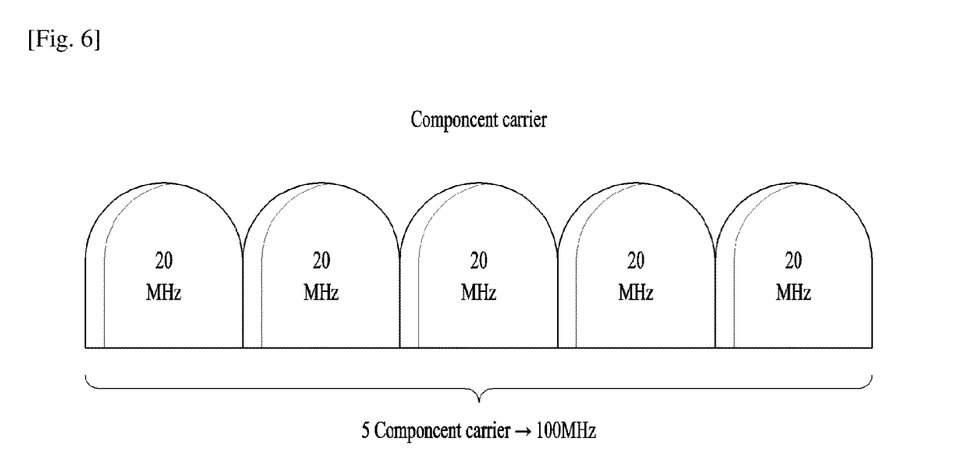
FIG. 6 is a diagram for carrier aggregation.

FIG. 6 is a diagram for carrier aggregation.

Carrier aggregation technology is for supporting wide bandwidth. In Release 10, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

Multiple carriers (component carriers) used for carrier aggregation may be, categorized into primary component carrier (PCC) and secondary component carrier (SCC). The PCC may be called P-cell (primary cell) and the SCC may be called S-cell (secondary cell). The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

Based on these newly introduced schemes, the timing advance management shall be enhanced as following.

Figure 7:
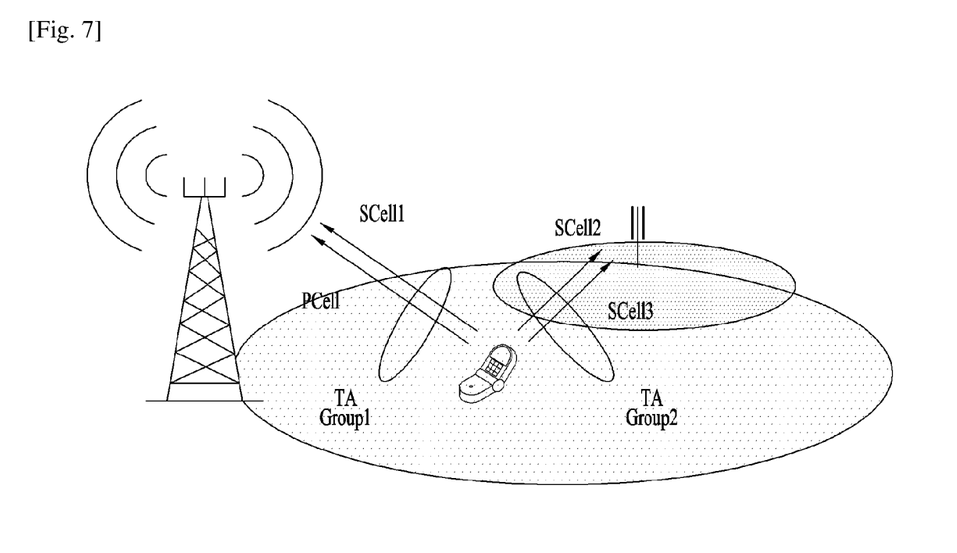
FIG. 7 is a diagram for explaining the concept of timing advance groups to be used for the present invention.

FIG. 7 is a diagram for explaining the concept of timing advance groups to be used for the present invention.

A UE can be connected to a macro base station (MeNB) and small cell base station (SeNB) together, as shown in FIG. 7. MeNB may provide CA scheme, thus it may have PCell and SCell (SCell 1) for the UE. SeNB may also provide CA scheme, so it can have SCell 2 and SCell 3 for the UE.

In this case, the TA value for PCell and SCell 1 may be the same, since there is one MeNB. So, PCell and SCell 1 may belong to TA group 1. Likewise, TA value for SCell2 and SCell3 may be the same, so they can belong to TA group 2. TA management can be performed based on this concept of TA group (TAG). Hereinafter, 'pTAG' refers to the TAG including PCell. 'sTAG' refers to the TAG including only SCells.

In view of LAA, PCell and SCell 1 can be viewed as on licensed spectrum while SCell 2 and SCell 3 can be viewed as on unlicensed spectrum.

As stated above, in LAA, the unlicensed spectrum is aggregated as SCell for CA operation. It may be call as LAA SCell. When the random access is permitted on the LAA SCell, one embodiment of the present invention proposes to use contention-free random access (CFRA) rather than contention-based random access (CBRA).

However, it is observed that enhanced LAA can operate without PRACH at least in scenarios with limited separation between base stations on licensed and unlicensed carriers, if the initial values of timing advance and power control are defined, e.g. if the licensed and unlicensed carriers are in the same TAG Without supporting RA procedure on LAA SCell, it is not possible to acquire a TA for TAG including only LAA SCells based on conventional technology. Therefore, embodiments of the present invention is provided regarding how to handle the TA for LAA SCell without supporting RA on LAA SCell. Considering that Timing Alignment is managed per TAG, there would be the following solutions.

Embodiment 1—LAA SCell belongs to pTAG

Figure 8:
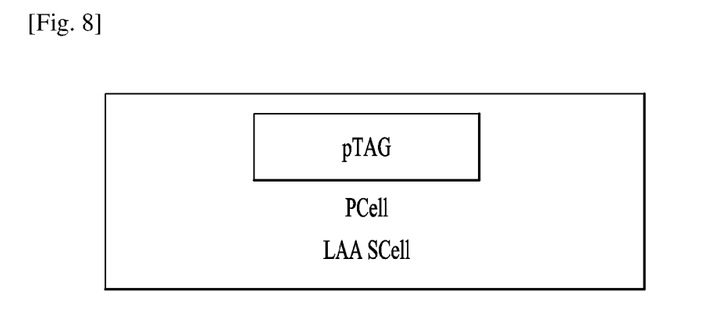
FIGS. 8-10 respectively show the concept of embodiments 1-3 of the present invention.

FIG. 8 shows the concept of embodiment 1 of the present invention.

One of the embodiments of the present invention proposes configuring LAA SCell to belong to pTAG. Based on this, TA can be acquired by performing random access procedure on PCell in pTAG. As PCell is always configured, embodiment 1 is always possible.

However, according to this embodiment 1, only the LAA SCells which have a similar TA value with PCell can be used. Considering that LAA SCell is on unlicensed band while PCell is on licensed band, it would limit the use of LAA SCells.

Embodiment 2—LAA SCell Belongs to sTAG Including an SCell on Licensed Band

Figure 9:
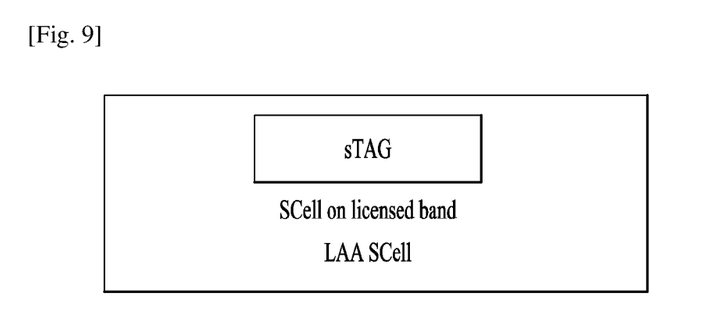

FIG. 9 shows the concept of embodiment 2 of the present invention.

If at least one Licensed-SCell is already configured for sTAG, LAA SCell can belong to that sTAG to which a Licensed-SCell belongs. Then, TA can be acquired by performing random access procedure on a Licensed-SCell in the same sTAG to which the LAA SCell belongs.

However, according to embodiment 2, sTAG exists only when there is at least one Licensed-SCell. Therefore, if there is no Licensed-SCell configured to the UE, LAA. SCell cannot belong to any TAG, hence, LAA SCell cannot be used. Alternatively, a Licensed-SCell can be added prior to configuring the LAA SCell, then LAA SCell can belong to the sTAG to which Licensed-SCell belong to and TA can be acquired by performing random access procedure on that Licensed-SCell. This would bring unnecessary addition of an Licensed-SCell only to acquire TA of LAA SCell.

Figure 10:
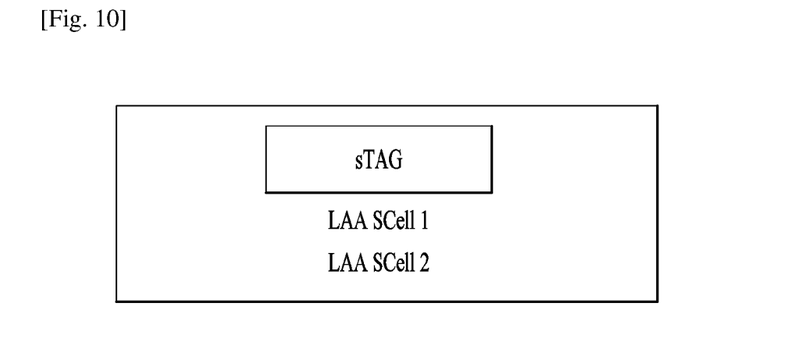

Embodiment 3—LAA SCell Belongs to sTAG Including Only LAA SCells and a Pre-Defined TA Value is Applied to that sTAG FIG. 10 shows the concept of embodiment 3 of the present invention. FIG. 10 shows an example where sTAG includes LAA SCell 1 and LAA SCell 2, but it is only exemplary.

Since the sTAG is configured with only LAA SCells, network has a flexibility to configure an LAA SCell without considering other SCells on licensed band or TA of PCell.

However, without supporting random access on LAA SCell, TA cannot be acquired for the sTAG including only LAA SCells. Therefore, a pre-defined value should be used for this sTAG.

Analysis of Embodiments 1-3

Embodiment 2 is preferred when configuring at least one licensed cell for each TAG is not an issue. However, the embodiment 2 is not preferred because we want to have a complete solution which always works well regardless of whether there is an SCell on licensed band or not. In this sense, the embodiment 1 seems possible since PCell and pTAG always exist. However, given that unlicensed band is considered as a good complementary tool to augment services and throughput, it wouldn't be desirable to restrict the chance to use unlicensed band by configuring only the LAA SCells having similar TA with PCell.

Therefore, the present invention is in view that embodiment 3 could support the use of LAA SCell efficiently even without RA on LAA SCell. Although a pre-defined TA value is required, considering that LAA SCell would be a small cell, TA value could be assumed e.g., 0.

Figure 11:
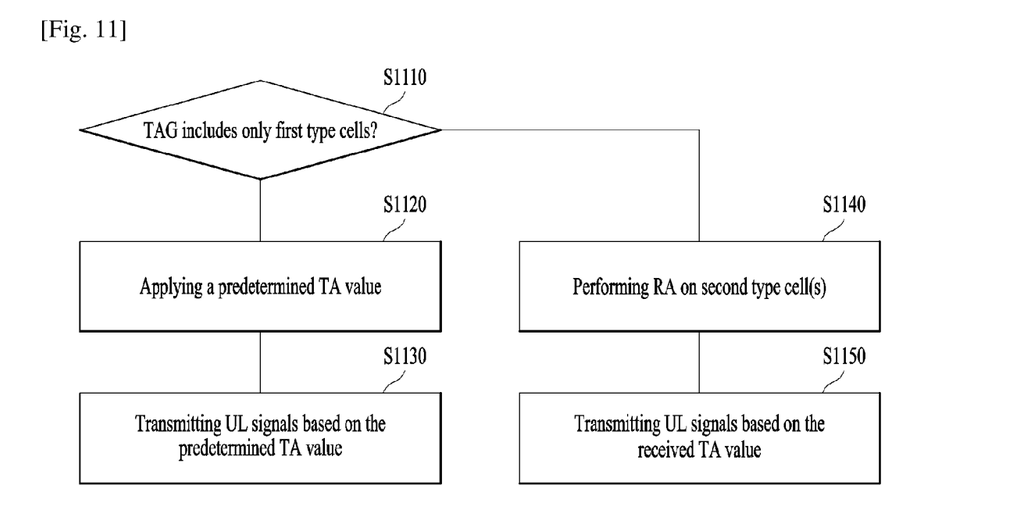
FIG. 11 shows the flow chart for the preferred embodiment of the present invention.

FIG. 11 shows the flow chart for the preferred embodiment of the present invention.

When the UE wants to transmit uplink signals to a network, the UE determines whether the TAG includes only first type cells (S1110). Here, the first type cells are defined as cells on which RA is not supported. They can be LAA SCells as stated above, but they can be other cells on which RA is not supported by using newly introduced technology.

When the TAG includes only the first type cells, the UE applies a predetermined timing advance value for that TAG (S1120). Here, the predetermined TA value can be set to 0 as stated above, hut it may be set as a value considering the distance between the Node providing the first type cells and the UE. Based on it, the UE may transmit uplink signal to the network on one of the first type cells based on the timing advance value applied for the TAG (S1130).

On the other hand, if the TAG includes one or more second type cells where the random access procedure is supported at step S1110, the UE may not apply the predetermined TA value. Rather, the UE may perform the random access procedure on the second type cell(s) (S1140). RA procedure may be either CFRA or CBRA. In this case, the UE may apply the received timing advance value for the TAG based on RA procedure.

Figure 12:
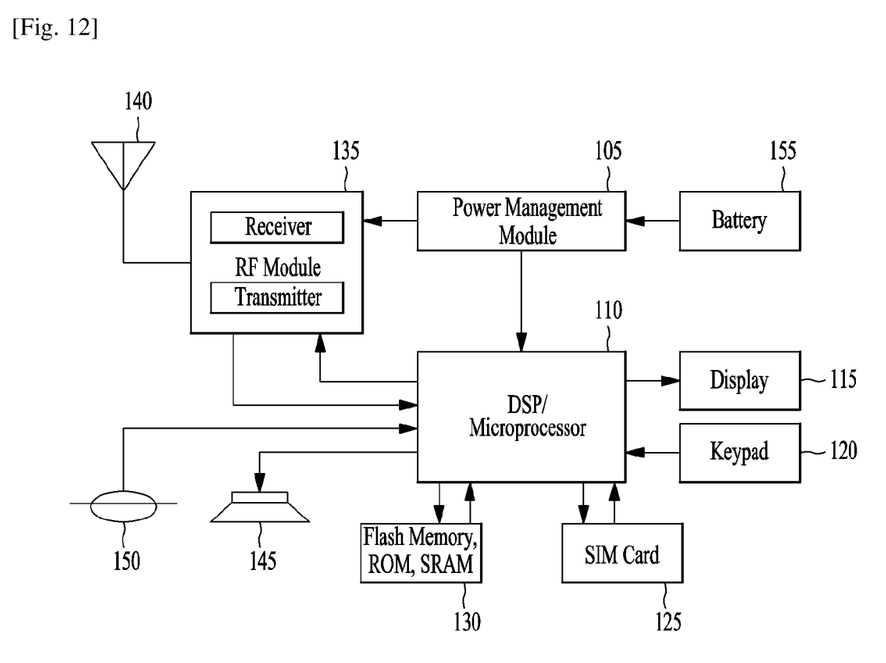
FIG. 12 is a block diagram of a communication apparatus according to an embodiment of the present invention.

FIG. 12 is a block diagram of a communication apparatus according to an embodiment of the present invention.

The apparatus shown in FIG. 12 can be a user equipment (UE) and/or eNB adapted to perform the above mechanism, but it can be any apparatus for performing the same operation.

As shown in FIG. 12, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 12 may represent a UE comprising a receiver (135) configured to receive signal from the network, and a transmitter (135) configured to transmit signals to the network. These receiver and the transmitter can constitute the transceiver (135). The UE further comprises a processor (110) connected to the transceiver (135: receiver and transmitter).

Also, FIG. 12 may represent a network apparatus comprising a transmitter (135) configured to transmit signals to a UE and a receiver (135) configured to receive signal from the UE. These transmitter and receiver may constitute the transceiver (135). The network further comprises a processor (110) connected to the transmitter and the receiver.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', 'gNB', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP system, the present invention is applicable to a variety of wireless communication systems, e.g. IEEE system, in addition to the 3GPP system.

The invention claimed is:

1. A method for a user equipment (UE) transmitting uplink signals to a network, the method comprising:
   determining whether a TAG (Timing Advance Group) includes only one or more first type cells corresponding to Licensed Assisted Access (LAA) secondary cells, or further includes one or more second type cells in addition to the first type cells,
   wherein the second type cells include one or more of a primary cell and a secondary cell configured in a licensed spectrum;
   applying a predetermined timing advance value for the TAG based on a determination that the TAG includes only the first type cells corresponding to the LAA secondary cells,
   wherein the first type cells corresponding to the LAA secondary cells are cells where a random access procedure is not supported, and
   wherein the second type cells are cells where a random access procedure is supported; and
   transmitting the uplink signals to the network on one of the first type cells based on the timing advance value for the TAG.

2. The method of claim 1, wherein the predetermined timing advance value is 0.

3. The method of claim 1, wherein, based on a determination that the TAG further includes the second type cells, the method further comprises:
   performing the random access procedure on one of the second type cells to receive a timing advance value from the network; and
   applying the received timing advance value for the TAG.

4. A user equipment (UE) for transmitting uplink signals to a network, the UE comprising:
   a processor configured to determine whether a TAG (Timing Advance Group) includes only one or more first type cells corresponding to Licensed Assisted Access (LAA) secondary cells, or further includes one or more second type cells in addition to the first type cells; to apply a predetermined timing advance value for the TAG based on a determination that the TAG includes only the first type cells corresponding to the LAA secondary cells, wherein the first type cells corresponding to the LAA secondary cells are cells where a random access procedure is not supported, wherein the second type cells include one or more of a primary cell and a secondary cell configured in a licensed spectrum, and wherein the second type cells are cells where a random access procedure is supported; and
   a transceiver operatively connected to the processor and configured to transmit the uplink signals to the network on one of the first type cells based on the timing advance value for the TAG.

5. The UE of claim 4, wherein the predetermined timing advance value is 0.

6. The UE of claim 4, wherein, based on a determination that the TAG further includes the second type cells, the processor is further configured to perform the random access procedure on one of the second type cells to receive a timing advance value from the network.

* * * * *